United States Patent
Eun (10) Patent No.: US 9,565,326 B2
(45) Date of Patent: Feb. 7, 2017

(54) IMAGE FORMING APPARATUS AND METHOD

(71) Applicant: Jongsook Eun, Tokyo (JP)

(72) Inventor: Jongsook Eun, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 25 days.

(21) Appl. No.: 13/875,596

(22) Filed: May 2, 2013

(65) Prior Publication Data

US 2013/0321847 A1    Dec. 5, 2013

(30) Foreign Application Priority Data

Jun. 1, 2012  (JP) ................................. 2012-125773

(51) Int. Cl.
*G06K 15/00* (2006.01)
*H04N 1/00* (2006.01)
*H04N 1/44* (2006.01)

(52) U.S. Cl.
CPC ...... *H04N 1/00891* (2013.01); *H04N 1/00037* (2013.01); *H04N 1/00082* (2013.01); *H04N 1/00875* (2013.01); *H04N 1/00904* (2013.01); *H04N 1/4426* (2013.01); *H04N 1/4433* (2013.01); *H04N 2201/0082* (2013.01); *H04N 2201/0094* (2013.01)

(58) Field of Classification Search
CPC ............ H04N 1/00037; H04N 1/00082; H04N 1/00875; H04N 1/00891; H04N 1/00904; H04N 1/4426; H04N 1/4433; H04N 2201/0082; H04N 2201/0094

See application file for complete search history.

(56) References Cited

U.S. PATENT DOCUMENTS

| | | |
|---|---|---|
| 2008/0231878 A1 | 9/2008 | Yano et al. |
| 2009/0144573 A1 | 6/2009 | Ohhashi |
| 2009/0204710 A1* | 8/2009 | Wada ............................ 709/225 |
| 2011/0058206 A1* | 3/2011 | Park ................... H04N 1/00885 358/1.14 |
| 2011/0208986 A1 | 8/2011 | Soga |
| 2012/0099136 A1* | 4/2012 | Ueda .................... G06Q 20/346 358/1.14 |
| 2012/0099138 A1* | 4/2012 | Hirata .......................... 358/1.14 |

(Continued)

FOREIGN PATENT DOCUMENTS

| | | |
|---|---|---|
| JP | 11-126000 | 5/1999 |
| JP | 2000-232540 | 8/2000 |

(Continued)

*Primary Examiner* — Tammy Paige Goddard
*Assistant Examiner* — Bharatkumar Shah
(74) *Attorney, Agent, or Firm* — Oblon, McClelland, Maier & Neustadt, L.L.P.

(57) ABSTRACT

An image forming apparatus includes a detector that detects a user near the image forming apparatus, an authentication device controller that controls an authentication device that the user owns, an authentication unit that authenticates the user, and a power supply controller that controls supplying electric power to component devices of the image forming apparatus, and the power supply controller supplies electric power to component devices of the image forming apparatus in stages upon detecting the user, determining the validity of the authentication device, and authenticating the user.

7 Claims, 7 Drawing Sheets

(56) References Cited

U.S. PATENT DOCUMENTS

2013/0010335 A1* 1/2013 Baba ............... G03G 15/5004
358/3.01

FOREIGN PATENT DOCUMENTS

| | | |
|---|---|---|
| JP | 2001-268283 | 9/2001 |
| JP | 2001-274928 | 10/2001 |
| JP | 2003-195986 | 7/2003 |
| JP | 2003-241582 | 8/2003 |
| JP | 2004-112718 | 4/2004 |
| JP | 2004-135215 | 4/2004 |
| JP | 2005-080105 | 3/2005 |
| JP | 2006-350859 | 12/2006 |
| JP | 2007-290178 | 11/2007 |
| JP | 2008-067189 | 3/2008 |
| JP | 2008-229990 | 10/2008 |
| JP | 2009-061634 | 3/2009 |
| JP | 2009-104207 | 5/2009 |
| JP | 2009-132050 | 6/2009 |
| JP | 2010-128090 | 6/2010 |
| JP | 2011-059426 | 3/2011 |
| JP | 2011-160338 | 8/2011 |
| JP | 2011-170709 | 9/2011 |

* cited by examiner

| WAKING UP STAGES | CAUSE OF WAKING UP | POWER SUPPLY TARGET |
|---|---|---|
| WAKING UP STAGE 1 | DETECTED BY MOTION SENSOR | ID CARD READER |
| WAKING UP STAGE 2 | CONFIRM VALIDITY OF ID CARD | CONTROL PANEL |
| WAKING UP STAGE 3 | OPERATION ON IMAGE FORMING APPARATUS BY USER | ALL DEVICES |

IMAGE FORMING APPARATUS AND METHOD

CROSS-REFERENCE TO RELATED APPLICATION

This patent application is based on and claims priority pursuant to 35 U.S.C. §119 to Japanese Patent Application No. 2012-125773, filed on Jun. 1, 2012 in the Japan Patent Office, the entire disclosure of which is hereby incorporated by reference herein.

BACKGROUND

Technical Field

The present invention relates to energy saving technology for an image forming apparatus.

Background Art

Conventionally, an image forming apparatus that stops supplying electric power to its built-in devices to reduce electric power consumption in standby state in which a printing process or a scanning process is not executed is well known.

As an example of this kind of image forming apparatus, an image forming apparatus that wakes up from energy saving mode and transitions to normal mode only if a user is authenticated has been proposed (e.g., JP-2009-104207-A.)

In the technology disclosed in JP-2009-104207-A, an image forming apparatus has a built-in IC tag reader/writer and determines whether or not a user approaches the image forming apparatus by detecting an IC tag held by the user. The IC tag reader/writer reads user information from the IC tag to authenticate the user. Subsequently, if the user is authenticated, the image forming apparatus monitors user operation and transitions to normal mode from sleep mode if it detects user operation.

However, in the technology disclosed in JP-2009-104207-A, the IC tag reader/writer itself consumes considerable power. Also, it is difficult to reduce overall electric power consumption effectively since the image forming apparatus remains in normal mode once it wakes up from sleep mode and transitions to normal mode.

Furthermore, in the technology disclosed in JP-2009-104207-A, it is difficult to maintain adequate security since any user can use the image forming apparatus once an approaching user is authenticated.

SUMMARY

The present invention provides a novel image forming apparatus and method that reduces electric power consumption effectively and improves security.

More specifically, the present invention provides an image forming apparatus that includes a detector that detects a user near the image forming apparatus, an authentication device controller that controls an authentication device that the user owns, an authentication unit that authenticates the user, and a power supply controller that controls supplying electric power to component devices of the image forming apparatus, and the power supply controller supplies electric power to component devices of the image forming apparatus in stages upon detecting the user, determining the validity of the authentication device, and authenticating the user.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention will be described in detail below with reference to the drawings.

Figure 1:
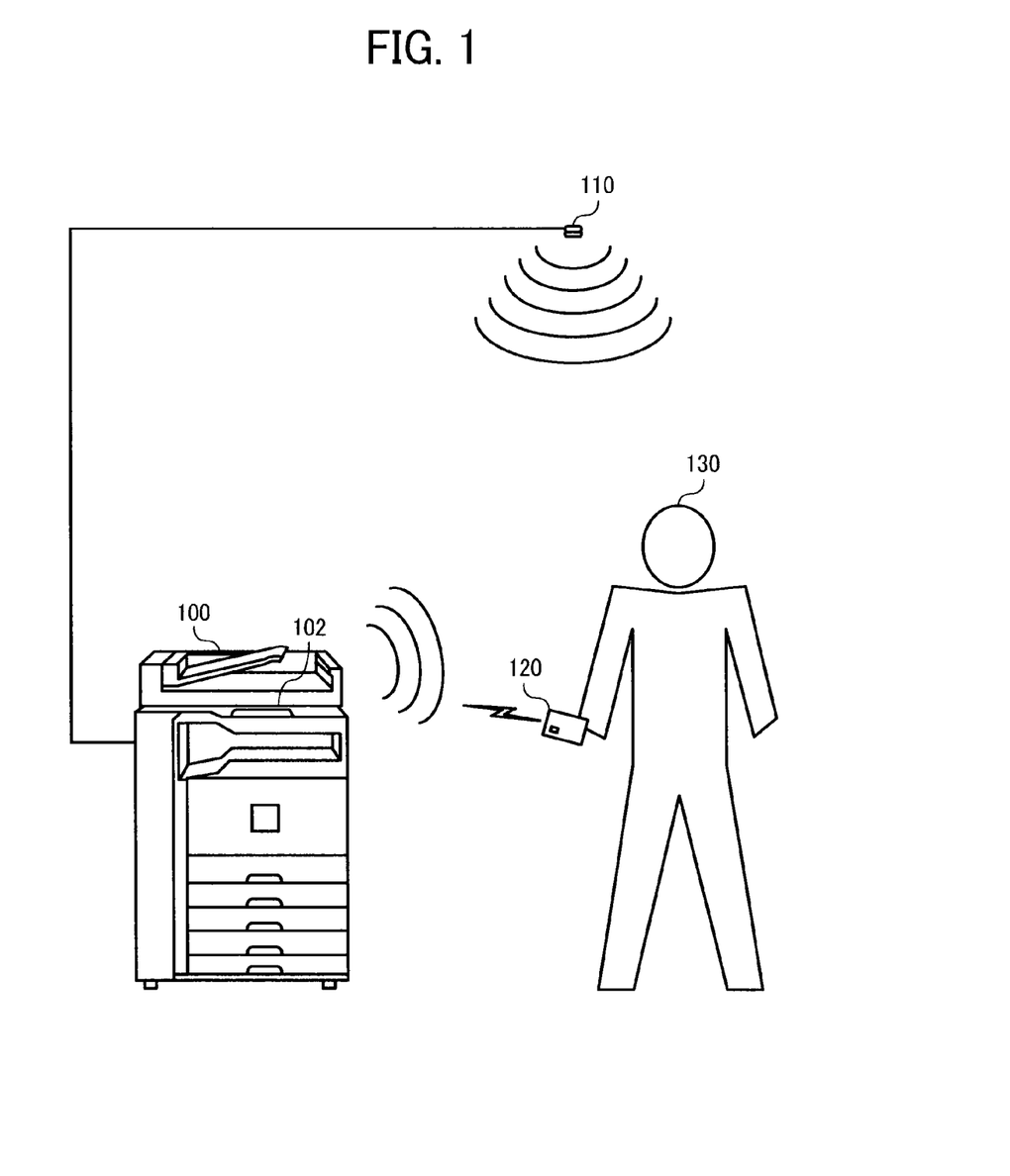
FIG. 1 is a diagram illustrating an image forming apparatus as an embodiment of the present invention.

FIG. 1 is a diagram illustrating an image forming apparatus 100 as an embodiment of the present invention. An image forming apparatus 100 executes processes such as printing, scanning, and sending scanned data. Although a multifunction peripheral (MFP) is adopted as the image forming apparatus 100 in this embodiment, alternatively a printer such as a laser printer and an inkjet printer can be adopted as the image forming apparatus 100 in other embodiments.

A motion sensor 110 is connected to the image forming apparatus 100. The motion sensor 110 detects a user 130 approaching the image forming apparatus. After detecting the user 130, the motion sensor 110 sends a detection signal to the image forming apparatus 100. An infrared sensor, an optical sensor, and a supersonic sensor can be adopted as the motion sensor 110. Also, a pressure sensor embedded in the floor can be used as the motion sensor 110.

After the motion sensor detects the user 130, the image forming apparatus 100 in sleep mode supplies electric power to an ID card reader (not shown in figures) that controls an ID card as an authentication device that the user owns and has it emit a radio wave signal to drive an IC tag included in an ID card 120. After being driven by the signal received from the image forming apparatus 100, the IC tag in the ID card 120 sends validity determining information to determine validity of the ID card 120.

The validity determining information includes identification data of the ID card, entering and leaving data of the user, attribute data of the user, and information on expiration date of the ID card.

An example of the identification data of the ID card 120 is a serial number of the ID card (e.g., IDm of a Felica card, UID of a Mifare card, and comID of an eLWISE card, etc.) The identification data of the ID card is stored in an IC chip included in the IC tag of the ID card 120.

The image forming apparatus 100 refers to identification data of ID cards authorizing use of the image forming apparatus that is stored in a storage device in the image forming apparatus and determines the validity of the ID card by determining whether or not the identification data of the ID card acquired from the ID card is present in the storage device.

The entering and leaving data of the user indicates whether the user is in the room or the user has left the room. In this embodiment, the entering and leaving data indicates whether or not the user is in the room where the image forming apparatus 100 is located or the user is in the building where the room in which the image forming apparatus 100 is located exists. In another embodiment, arriving and leaving data that indicates whether or not a user has arrived at an office can be adopted instead of the entering and leaving data of the user.

The entering and leaving data of the user is stored in the IC chip included in the IC tag of the ID card 120. The image forming apparatus 100 can determine the validity of the ID card 120 by determining whether or not the entering and leaving data of the user indicates that the user is in the room.

In another embodiment, the entering and leaving data of the user can be associated with the identification data of the ID card and can be stored in the storage device in the image forming apparatus or in a server accessible from the image forming apparatus. In this case, the image forming apparatus 100 can determine the validity of the ID card 120 by determining whether or not the entering and leaving data of the user indicates that the user is in the room after acquiring the entering and leaving data of the user associated with the identification data of the ID card from the storage device in the server or the image forming apparatus.

The attribute information of the user indicates an organization to which a user belongs. For example, identification data that indicates the department or division to which the user belongs can be adopted. The attribute information of the user is stored in the IC chip included in the IC tag of the ID card 120. The image forming apparatus 100 refers to identification data of organizations allowed to use the image forming apparatus stored in the storage device in the image forming apparatus 100 or the server and determines validity of the ID card 120 by determining whether or not the attribute information of the user acquired from the IC chip exists in the storage device.

In another embodiment, the attribute information of the user can be associated with the identification data of the ID card and can be stored in the storage device in the image forming apparatus or in the server accessible from the image forming apparatus. In this case, the image forming apparatus 100 can determine the validity of the ID card 120 by determining whether or not the attribute information of the user matches the attribute information of the organization allowed to use the image forming apparatus stored in the server or the image forming apparatus 100 after acquiring the attribute information of the user associated with the identification data of the ID card 120.

The information on expiration date of the ID card 120 is stored in the IC chip included in the IC tag of the ID card 120. The image forming apparatus 100 refers to current date that the image forming apparatus 100 holds and determines the validity of the ID card 120 by determining whether or not the expiration date indicated by the information on expiration date acquired from the IC chip has already been reached.

In another embodiment, the information on expiration date of the ID card can be associated with the identification data of the ID card and can be stored in the image forming apparatus or the server connected to the image forming apparatus via a network. In this case, the image forming apparatus 100 can determine the validity of the ID card 120 by determining whether or not the expiration date indicated by the information on expiration date of the ID card has passed the current date that the image forming apparatus 100 holds after acquiring the information on expiration date of the ID card associated with the identification data of the ID card 120 from the storage device in the server or the image forming apparatus.

The image forming apparatus 100 determines the validity of the ID card 120 using the validity determining information described above. If the ID card 120 is valid, the image forming apparatus 100 activates the control panel 102 and enables the user 130 to input user authentication data that identifies the user 130 uniquely. After the user 130 inputs the user authentication data using the control panel 102, the image forming apparatus 100 executes user authentication using the user authentication data.

After authenticating the user, the image forming apparatus 100 monitors whether or not a cause of waking up from energy saving mode to normal mode occurs. If the cause of waking up occurs, the image forming apparatus 100 activates devices included in the image forming apparatus 100 and transitions from energy saving mode to normal mode.

The cause of waking up includes holding down the power key to wake up from energy saving mode, setting documents to a document feeder, opening or closing a platen or the document feeder, holding down an operation key, setting documents to a manual feed tray, executing a print job, opening or closing a cover, and opening or closing a feed tray.

Although the ID card is used as the authentication device in this embodiment, in other embodiments any device that includes an IC chip, such as an employee ID card or a cell phone, can be adopted as the authentication device.

Also, although a user is found by using the motion sensor 110 in this embodiment, in other embodiments the ID card reader can be configured to detect a user near the image forming apparatus 100 by receiving the validity determining information of the ID card that the ID card transmits. In this case, if multiple users are detected by the validity determining information that the ID card transmits, the ID card reader can be configured to execute the authentication process only for the user authenticated firstly.

Figure 2:
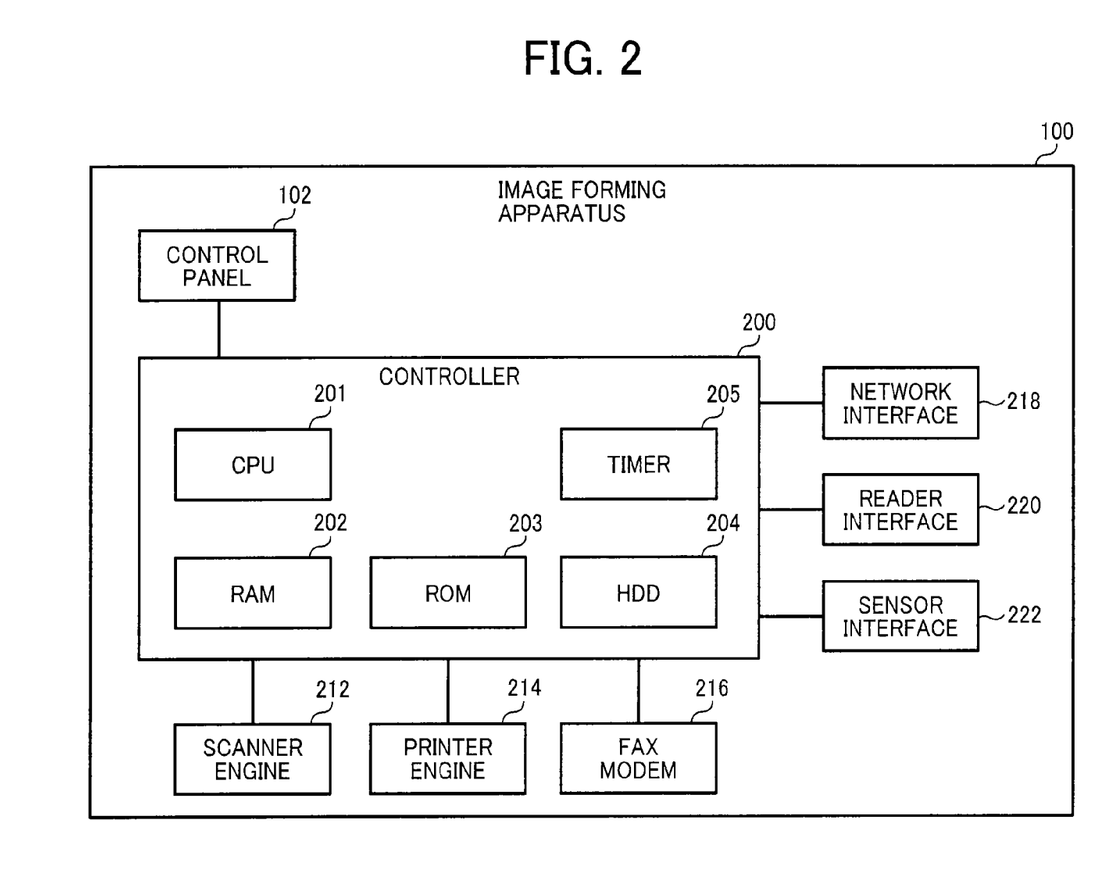
FIG. 2 is a block diagram illustrating a hardware configuration of the image forming apparatus.

FIG. 2 is a block diagram illustrating a hardware configuration of the image forming apparatus. The image forming apparatus 100 includes a controller 200 that controls the image forming apparatus 100 as a whole.

The controller 200 includes a CPU 201, a RAM 202 that provides a work area, a ROM 203, and a HDD 204. Each functional unit of this embodiment (described later) can be implemented on the image forming apparatus running executable programs written in programming languages such as C, C++, C#, Java, and Javascript into the RAM 202 and executing them. Also, the controller 200 includes a timer 205 for timing, and functional units use the timer 205 for timing accordingly.

The image forming apparatus 100 includes the control panel 102, a scanner engine 212, and a printer engine 214. The control panel 102 displays various User Interfaces (Ms) and accepts various operations on the image forming apparatus 100. The scanner engine 212 scans a document and generates image data. The printer engine 214 prints image data and print data on paper.

Furthermore, in the present embodiment, the image forming apparatus 100 includes a FAX modem 216, a network interface 218, a reader interface 220, and a sensor interface 222.

The FAX modem 216 sends and receives image data via telephone lines. The network interface 218 is an interface to connect to networks such as LAN and internet. The reader interface 220 is an interface to connect to the ID card reader. The controller 200 controls the ID card reader via the reader interface 220. The sensor interface 222 is an interface to connect to the motion sensor 110. The controller 200 receives a detection signal from the motion sensor 110 via the sensor interface 222.

Figure 3:
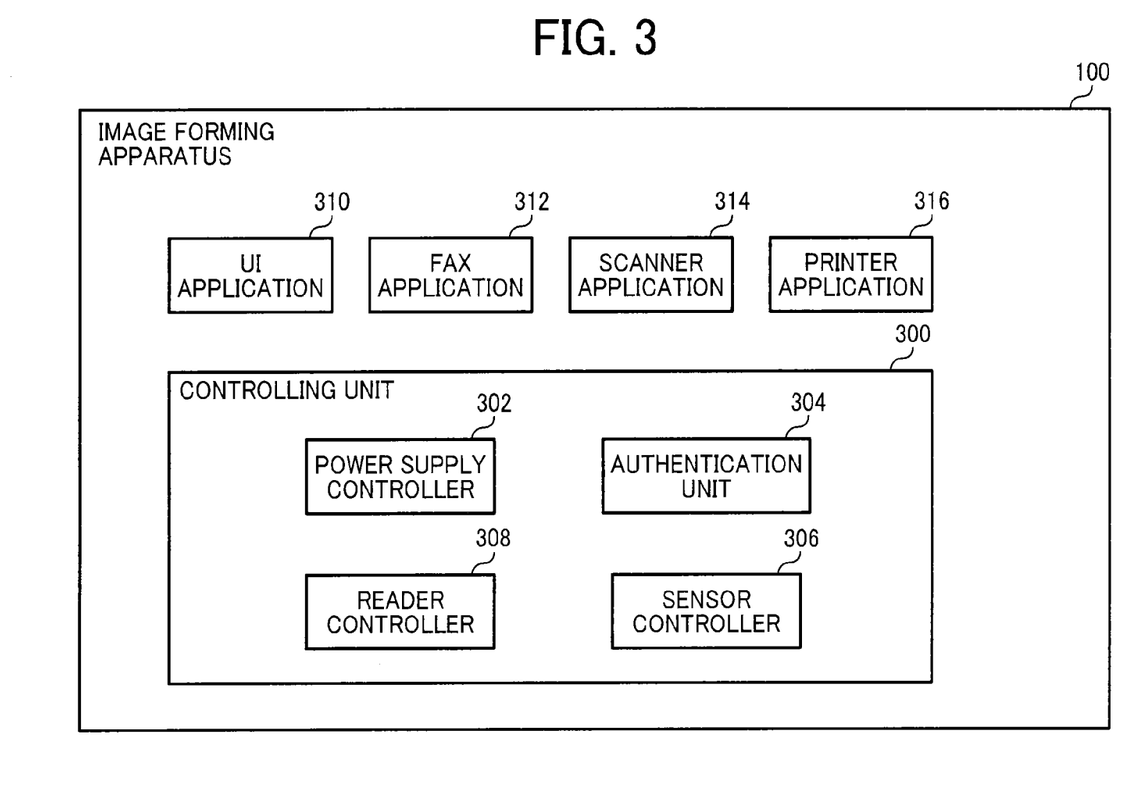
FIG. 3 is a block diagram illustrating functional units included in the image forming apparatus.

A functional configuration of the image forming apparatus 100 will be described below with reference to FIG. 3. FIG. 3 is a block diagram illustrating functional units included in the image forming apparatus.

The image forming apparatus 100 includes a controlling unit 300, a UI application 310, a FAX application 312, a scanner application 314, and a printer application 316. The controlling unit 300 includes a power supply controller 302, an authentication unit 304, a sensor controller 306, and a reader controller 308.

The power supply controller 302 controls power supply to component devices of the image forming apparatus 100 such as the ID card reader and the control panel 102 in stages.

The authentication unit 304 authenticates users. The authentication unit 304 executes user authentication using user authentication data that the user inputs via the control panel 102.

The sensor controller 306 controls the motion sensor 110. The sensor controller 306 receives a detection signal from the motion sensor 110. The sensor controller 306 notifies the reader controller 308 of receiving the detection signal.

The reader controller 308 controls the ID card reader that controls the ID card 120 as the authentication device. After receiving notification indicating that the sensor controller 306 received a detection signal, the reader controller 308 has the ID card reader transmit signal for driving the ID card 120. After the ID card reader receives the validity determining data from the ID card 120, the reader controller 308 determines the validity of the ID card 120 and notifies the power supply controller 302 of the determining result.

While the reader controller 308 determines the validity of the ID card 120 in this embodiment, the power supply controller 302 or other functional unit can determine the validity of the ID card 120 using the validity determining data in other embodiments.

The user interface (UI) application 310 is a functional unit for controlling the control panel 102. The UI application 310 displays various UIs on the control panel 102. The UIs displayed on the control panel 102 include a UI that allows input of user authentication data.

The FAX application 312 sends scanned image data via FAX and prints image data received externally via FAX. The scanner application 314 scans a document controlling the scanner engine 212 and generates image data. The printer application 316 controls the printer engine 214 and executes printing.

Figure 4A:
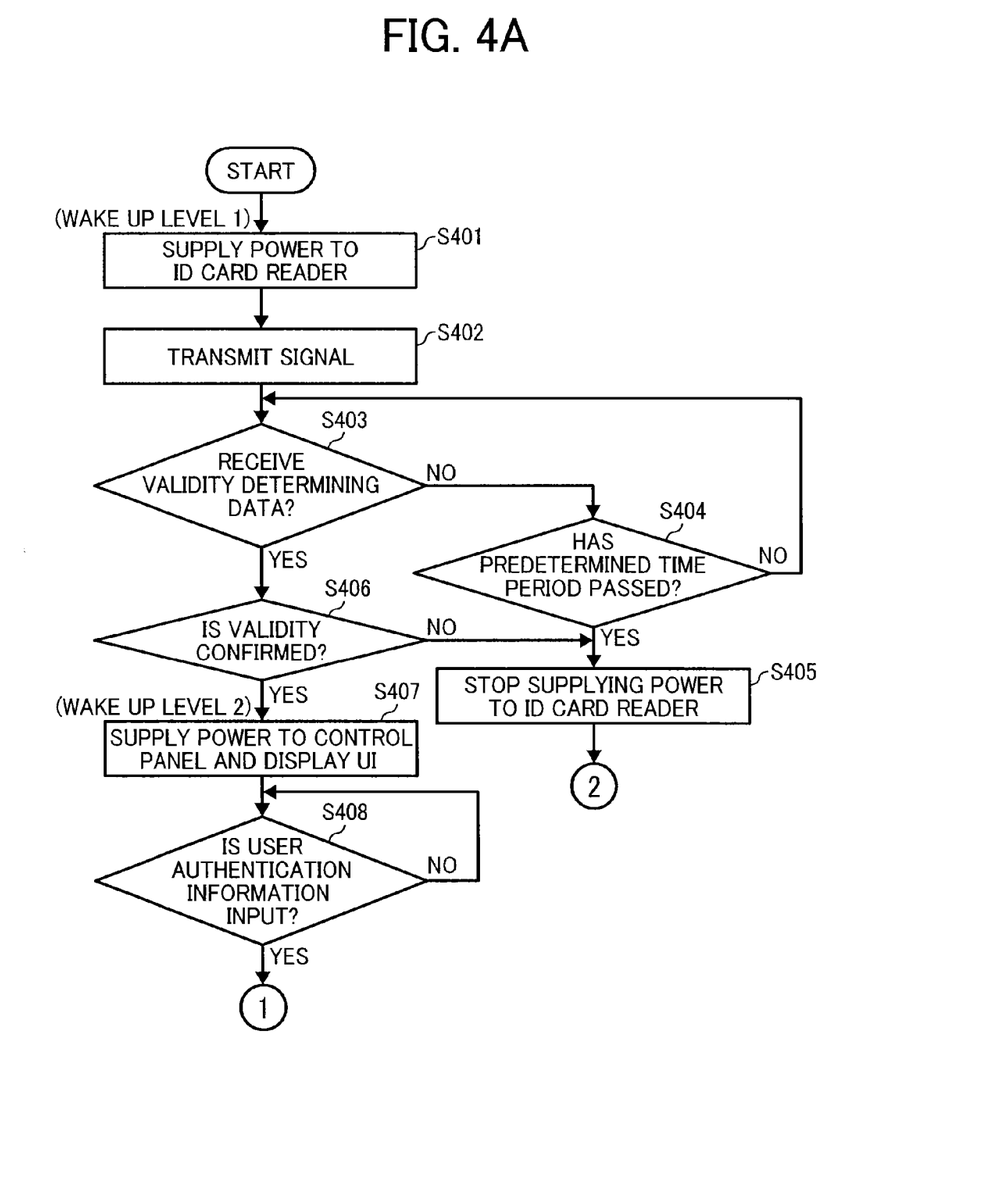
FIGS. 4A and 4B are flowcharts illustrating a process of the image forming apparatus in sleep mode as an embodiment of the present invention.
Figure 4B:
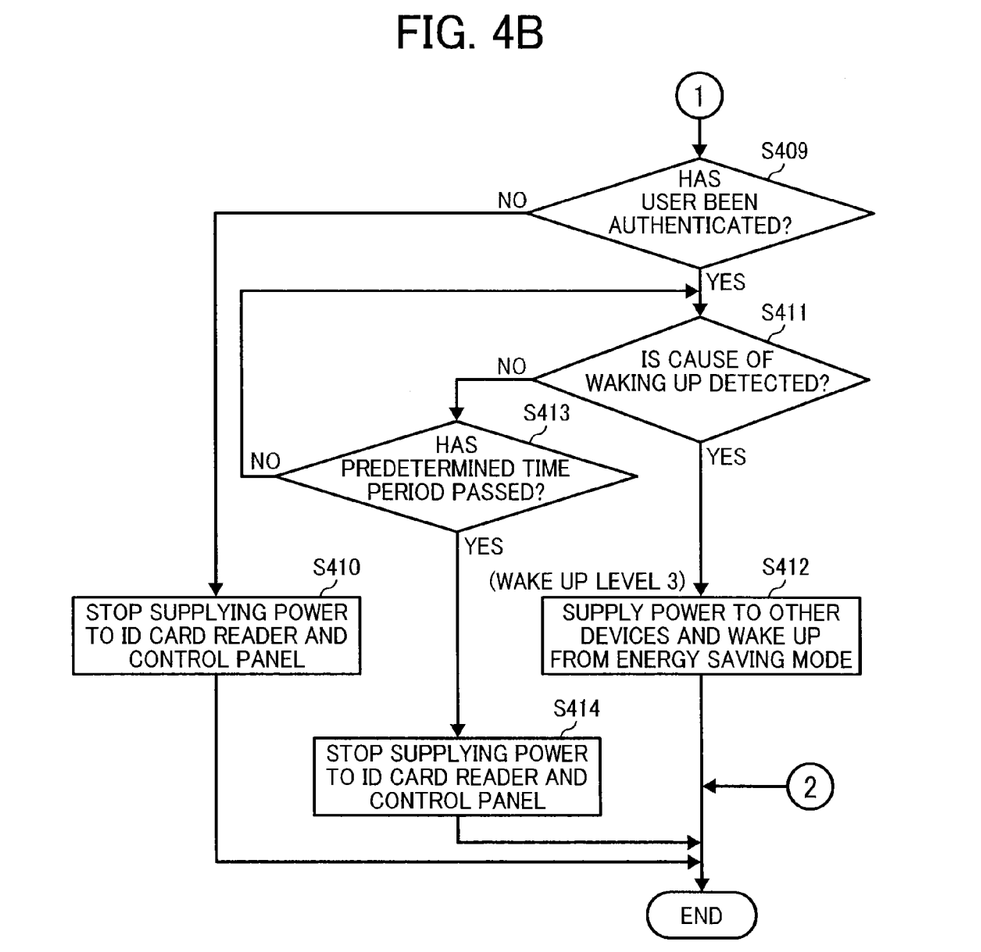

A process that the image forming apparatus 100 executes after receiving a detection signal from the motion sensor 110 will be described below with reference to FIGS. 4A and 4B. FIGS. 4A and 4B are flowcharts illustrating a process of the image forming apparatus in sleep mode.

In FIG. 4A, the process starts after the image forming apparatus 100 receives a detection signal from the motion sensor 110. The power supply controller 302 in the controlling unit 300 supplies power to the ID card reader in S401. The reader controller 308 has the ID card reader transmit signal for driving the ID card 120 in S402.

In this embodiment, the ID card 120 sends the validity determining data after being driven by the signal that the ID card reader transmits. In another embodiment, after receiving a signal that indicates that the ID card 120 has been activated, the reader controller 308 can send the signal for having the ID card 120 provide the validity determining data to the ID card 120 and acquire the validity determining data.

The reader controller 308 determines whether or not the reader controller 308 has already received the validity determining data in S403. If the reader controller 308 has not received the validity determining data yet (NO in S403), the process proceeds to S404. The reader controller 308 determines whether or not a predetermined time period has passed after the ID card reader transmitted the signal in S404. It is preferable to set the predetermined time period longer than a time period in which the ID card reader transmits signal and the ID card 120 is activated and sends the validity determining data.

If the predetermined time period has not passed yet after the ID card reader transmitted the signal (NO in 404), the process returns to S403. Alternatively, if the predetermined time period has already passed after the ID card reader transmitted the signal (YES in 404), the process proceeds to S405. The power supply controller 302 stops supplying power to the ID card reader in S405, and the process ends. Accordingly, the amount of power consumption of the image forming apparatus 100 can be reduced effectively since the image forming apparatus 100 stops supplying power to the ID card reader and goes back to energy saving mode if the validity determining data is not received.

Alternatively, if it is determined that the validity determining data is received (YES in S403), the process proceeds to S406. The reader controller 308 confirms the validity of the ID card 120 using the validity determining data in S406. If the validity of the ID card 120 is confirmed (YES in S406), the process proceeds to S407.

Alternatively, if the validity of the ID card 120 is not confirmed (NO in S406), the process proceeds to S405. The power supply controller 302 stops supplying power to the ID card reader in S406, and the process ends. Accordingly, the amount of power consumption of the image forming apparatus 100 can be reduced effectively, and security can be improved by preventing the image forming apparatus 100 from unauthorized use since the image forming apparatus 100 stops supplying power to the ID card reader and goes back to energy saving mode if the validity of the ID card is not confirmed.

In S407, the power supply controller 302 supplies power to the control panel 102, and the UI application 310 displays a UI to accept input of user authentication data by user operation. In S408, the UI application 310 determines whether or not the user authentication data has been input. If the user authentication data has not been input (NO in S408), the process repeats S408. Alternatively, if the user authentication data has been input (YES in S408), the process proceeds to S409.

The authentication unit 304 determines whether or not the user can be authenticated in S409. If the user authentication failed (NO in S409), the process proceeds to S410. The power supply controller 302 stops supplying power to the ID card reader and the control panel 102 in S410, and the process ends. Accordingly, the amount of power consumption of the image forming apparatus 100 can be reduced effectively, and security can be improved by preventing the image forming apparatus 100 from unauthorized use since the image forming apparatus 100 stops supplying power to the ID card reader and the control panel 102 and goes back to energy saving mode if the user authentication failed.

Alternatively, if the user authentication succeeds (YES in S409), the process proceeds to S411. The power supply controller 302 determines whether or not the cause of waking up is detected in S411. If the cause of waking up is detected (YES in S411), the process proceeds to S412. The power supply controller 302 supplies power to devices having been turned off in the image forming apparatus 100 and has the image forming apparatus 100 transition from energy saving mode to normal power consumption mode, and the process ends.

In this embodiment, the image forming apparatus 100 can provide functions allowed by authorization of a user specified by the identification data of the ID card. Information on user authorization can be associated with the identification data of the ID card and the authentication data of the user and can be registered in the server or the image forming apparatus 100, so that the image forming apparatus 100 enables functions allowed by the user authorization.

Alternatively, if the cause of waking up is not detected (NO in S411), the process proceeds to S413. The power supply controller 302 determines whether or not a predetermined time period has passed in S413. It is preferable to set the predetermined time period longer than an average time in which a user inputs user authentication data and starts operating the image forming apparatus 100.

Alternatively, if it is determined that the predetermined time period has passed (YES in S413), the process proceeds to S414. The power supply controller 302 stops supplying power to the ID card reader and the control panel 102 in S414, and the process ends. Accordingly, the amount of power consumption of the image forming apparatus 100 can be reduced effectively since the image forming apparatus 100 returns to energy saving mode if the user does not operate the image forming apparatus 100 for the predetermined time period even after the user authentication succeeds.

Since the image forming apparatus 100 supplies power to the ID card reader and has the ID card reader transmit the signal to drive the ID card after detecting the user as described above, the amount of power consumption in standby state can be reduced effectively. Also, since the image forming apparatus 100 supplies power to the control panel if the validity of the ID card 120 is confirmed, the amount of power consumption in standby state can be reduced effectively. Furthermore, since the image forming apparatus 100 can be used if the validity of the ID card 120 is confirmed and the user authentication succeeded, the security can be improved.

Figure 5:
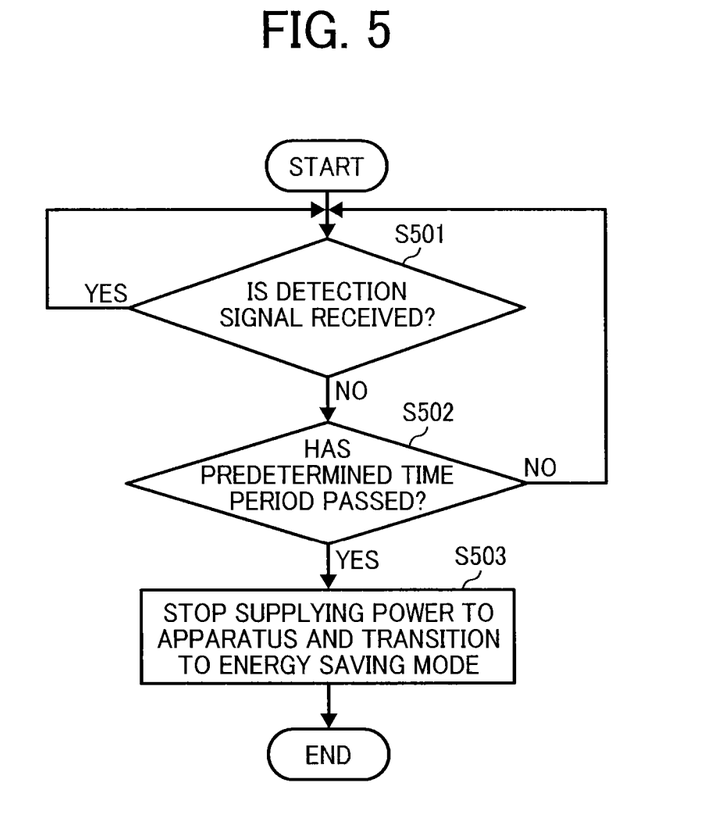
FIG. 5 is a flowchart illustrating a process of the image forming apparatus that wakes up from sleep mode.

A process that the image forming apparatus 100 executes after waking up from energy saving mode will be described below with reference to FIG. 5. FIG. 5 is a flowchart illustrating a process of the image forming apparatus that wakes up from sleep mode.

In FIG. 5, after the process starts, the sensor controller 306 determines whether or not the sensor controller 306 has received a detection signal from the motion sensor 110 in S501. If the detection signal has been received (YES in S501), the process repeats S501. Alternatively, if the detection signal is not received (NO in S501), the process proceeds to S502.

The sensor controller 306 starts measuring time at the time of determining that the detection signal is not received and determines whether or not a predefined time period has passed in S502. In this embodiment, it is preferable to adopt a time period lasting a few seconds after determining the detection signal is not received as the predefined time period.

If the predefined time period has not passed yet (NO in S502), the process returns to S501. Alternatively, if the predefined time period has passed (YES in S502), the process proceeds to S503. In S503, the power supply controller 302 stops supplying power to devices in the image forming apparatus 100, and the image forming apparatus transitions to sleep mode. The process ends.

Accordingly, the amount of power consumption of the image forming apparatus 100 can be reduced effectively since the image forming apparatus 100 returns to energy saving mode again if the user leaves from the image forming apparatus 100 even after the image forming apparatus 100 waked up from sleep mode. Also, the unused image forming apparatus 100 can be transitioned to sleep mode quickly since the motion sensor 110 detects if the user exists near the image forming apparatus 100 and it can be determined whether or not the image forming apparatus 100 is in use precisely. Furthermore, security can be improved since checking of the validity of the ID card 120 and user authentication is requisite anew in order to make the image forming apparatus 100 that had transitioned from normal power consumption state to sleep mode available again.

Figure 6:
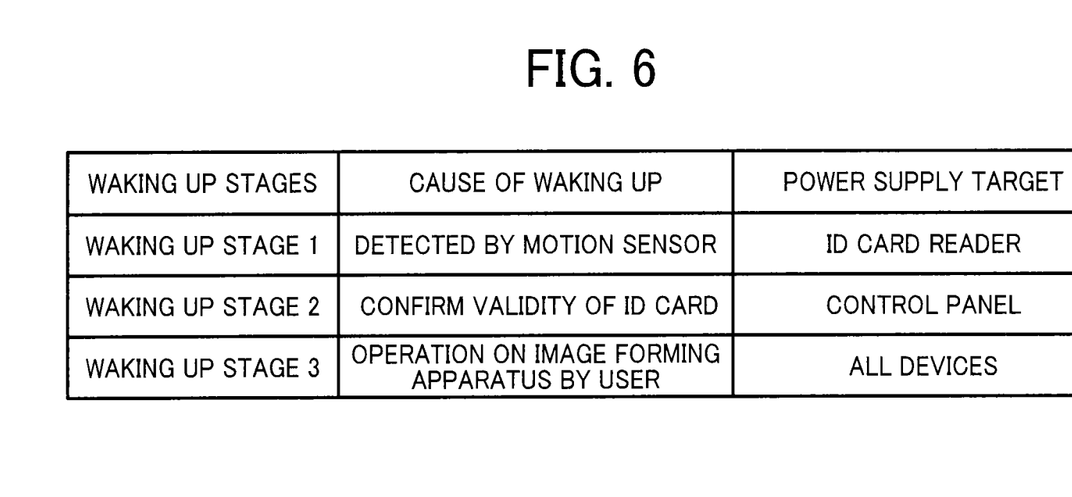
FIG. 6 is a diagram illustrating waking up stages in which the image forming apparatus wakes up from sleep mode in stages and causes of waking up and targets of supplying electric power in accordance with the waking up stages.

FIG. 6 is a diagram illustrating waking up stages in which the image forming apparatus wakes up from sleep mode in stages and causes of waking up and targets of supplying electric power in accordance with the waking up stages.

In this embodiment, if the image forming apparatus 100 is in sleep mode and the user is detected by the motion sensor 110, the ID card reader is activated and the image forming apparatus 100 transitions from sleep mode to waking up stage 1. Next, if the image forming apparatus 100 confirms the validity of the ID card 120, the control panel 102 is activated, and the image forming apparatus 100 transitions from the waking up stage 1 to waking up stage 2. Subsequently, if the user operates the image forming apparatus 100, devices having been turned off in the image forming apparatus are activated, and the image forming apparatus 100 transitions from the waking up stage 2 to waking up stage 3.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image forming apparatus, comprising:
   a detector to detect a user near the image forming apparatus;
   an authentication device controller configured to control an authentication device of the user and read validation data from the authentication device;

an input device to receive authentication data input by the user;

processing circuitry configured to authenticate the user, using the authentication data received by the input device; and a power supply that, in a first stage, initiates electric power to the authentication device controller when the detector detects the user, in a second stage, initiates electric power to the input device when a determination result from the authentication device controller indicates the authentication device of the user is valid, and, in a third stage, initiates electric power to image forming component devices of the image forming apparatus according to an authentication result of the processing circuitry, wherein, prior to the first stage, the power supply stops supplying the electric power to the authentication device controller, the authentication device of the user is separate from the image forming apparatus, and the authentication device controller is different from the input device.

2. The image forming apparatus according to claim 1, wherein the authentication device controller determines the validity of the authentication device using the validation data read from the authentication device.

3. The image forming apparatus according to claim 1, wherein the power supply stops supplying the electric power to the image forming component devices of the image forming apparatus when the detector does not detect the user within a predetermined time period after the power supply initiates the electric power to the image forming component devices of the image forming apparatus in the third stage.

4. A method of supplying electric power in an image forming apparatus, the method comprising:

initiating electric power to an authentication device controller of the image forming apparatus when a user is detected near the image forming apparatus, wherein, prior to initiating the electric power to the authentication device controller, a power supply stops supplying the electric power to the authentication device controller;

controlling, with the authentication device controller, an authentication device of the user;

receiving, at the authentication device controller, validation data from the authentication device;

determining validity of the authentication device;

initiating electric power to an input device when the authentication device is determined to be valid;

receiving, by the input device, authentication data input by the user;

authenticating the user, using processing circuitry, according to the authentication data received by the input device; and initiating electric power to image forming component devices of the image forming apparatus when the processing circuitry authenticates the user, wherein the authentication device controller is different from the input device.

5. A non-transitory recording medium storing a program that, when executed by a computer, causes the computer to implement a method of controlling supplying electric power in an image forming apparatus, the method comprising:

initiating electric power to an authentication device controller of the image forming apparatus when a user is detected near the image forming apparatus, wherein, prior to initiating the electric power to the authentication device controller, a power supply stops supplying the electric power to the authentication device controller;

controlling an authentication device of the user to signal validation data to the authentication device controller;

determining validity of the authentication device using the validation data;

initiating electric power to an input device when the authentication device is determined to be valid;

receiving authentication data input, which has been input into the input device by the user;

authenticating the user using the authentication data input by the user; and initiating electric power to image forming component devices of the image forming apparatus when the user is authenticated, wherein the authentication device controller is different from the input device.

6. The image forming apparatus according to claim 1, wherein, prior to the first stage, the power supply stops supplying the electric power to the input device and the power supply stops supplying the electric power to the image forming component devices of the image forming apparatus.

7. The method according to claim 4, wherein the determining of the validity of the authentication device is performed by the authentication device controller using the validation data received from the authentication device.

* * * * *